United States Patent [19]

Epstein

[11] 4,028,490

[45] June 7, 1977

[54] MSK DIGITAL DATA SYNCHRONIZATION DETECTOR

[75] Inventor: Marvin Aaron Epstein, Monsey, N.Y.

[73] Assignee: International Telephone and Telegraph Corporation, Nutley, N.J.

[22] Filed: Nov. 14, 1975

[21] Appl. No.: 632,044

[52] U.S. Cl. .................................. 178/88; 325/320; 235/181; 178/69.1

[51] Int. Cl.² ...................... H04L 17/16; H04L 7/00

[58] Field of Search .................. 178/66, 88, 69.5 R; 235/181; 307/232, 233, 269; 325/320–324; 328/133, 155

[56] References Cited

UNITED STATES PATENTS

| | | | |
|---|---|---|---|
| 2,977,417 | 3/1961 | Doelz et al. | 178/66 R X |
| 3,447,085 | 5/1969 | Haas et al. | 325/320 |
| 3,674,934 | 7/1972 | Gooding et al. | 178/88 |
| 3,772,600 | 11/1973 | Natali | 328/155 X |

OTHER PUBLICATIONS

B498,775, Mar. 1976, Balcewicz, 325/320.

Primary Examiner—Robert L. Richardson
Assistant Examiner—Aristotelis M. Psitos
Attorney, Agent, or Firm—John T. O'Halloran; Alfred C. Hill

[57] ABSTRACT

Baudot code characters each having start and stop bits are transmitted in the form of a MSK digital data signal having a stop-start triangle corresponding to adjacent stop and start bits of two adjacent Baudot characters. The MSK signal is correlated with MSK correlation waveforms to produce first and second correlation signals. Each of the first and second correlation signals are coupled to a different one of two delay lines each having three output taps separated by one bit time. The output signals from the output taps at a given time are appropriately summed to provide inphase and quadrature triangle signals. These triangle signals are operated on by an arithmetic unit to calculate many time and phase conditions of the MSK signal at one time and to produce third, fourth and fifth correlation signals as a function of assumed bit times. These third, fourth and fifth correlation signals are operated on by a ratio calculator to produce a ratio signal proportional to the ratio of a minimum magnitude squared to a maximum magnitude squared for all carrier phase angles for each of the assumed bit times. A synchronization detected signal is produced when the ratio signal value is less than a given amplitude threshold.

9 Claims, 6 Drawing Figures

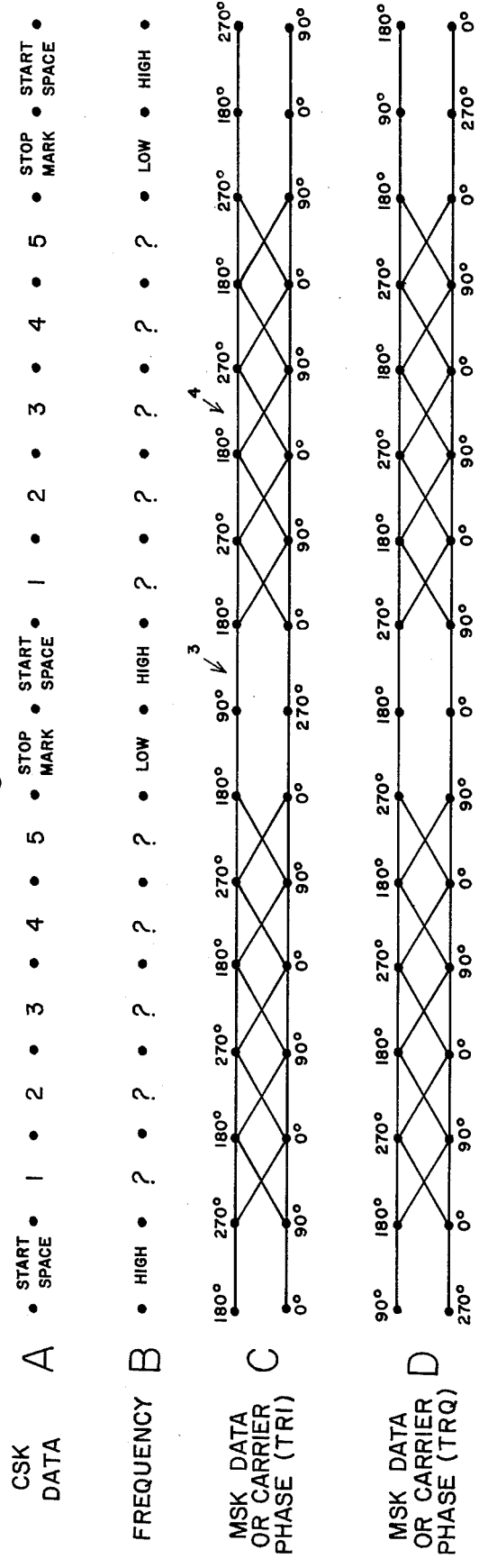
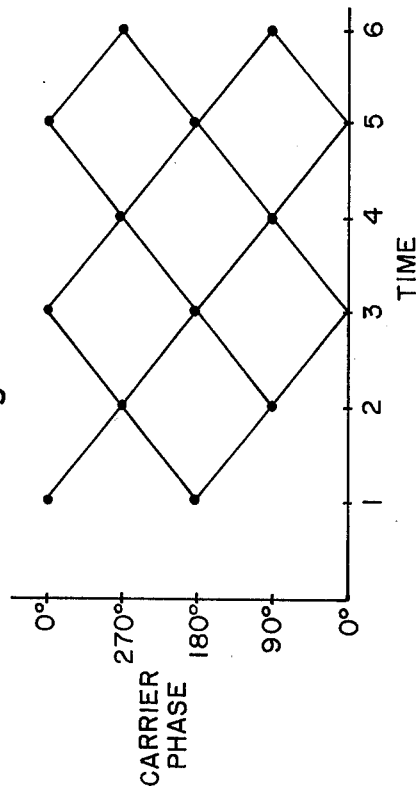
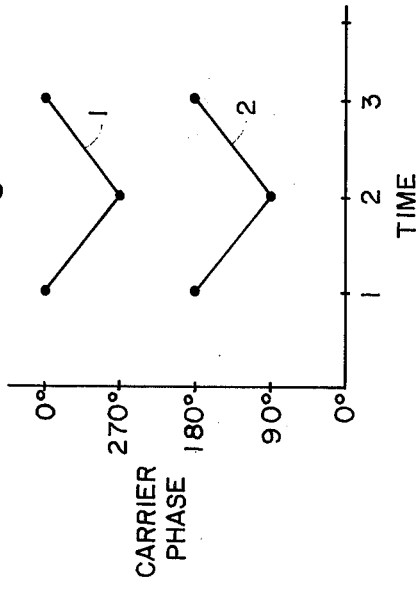
Fig. 1
Fig. 2
Fig. 3

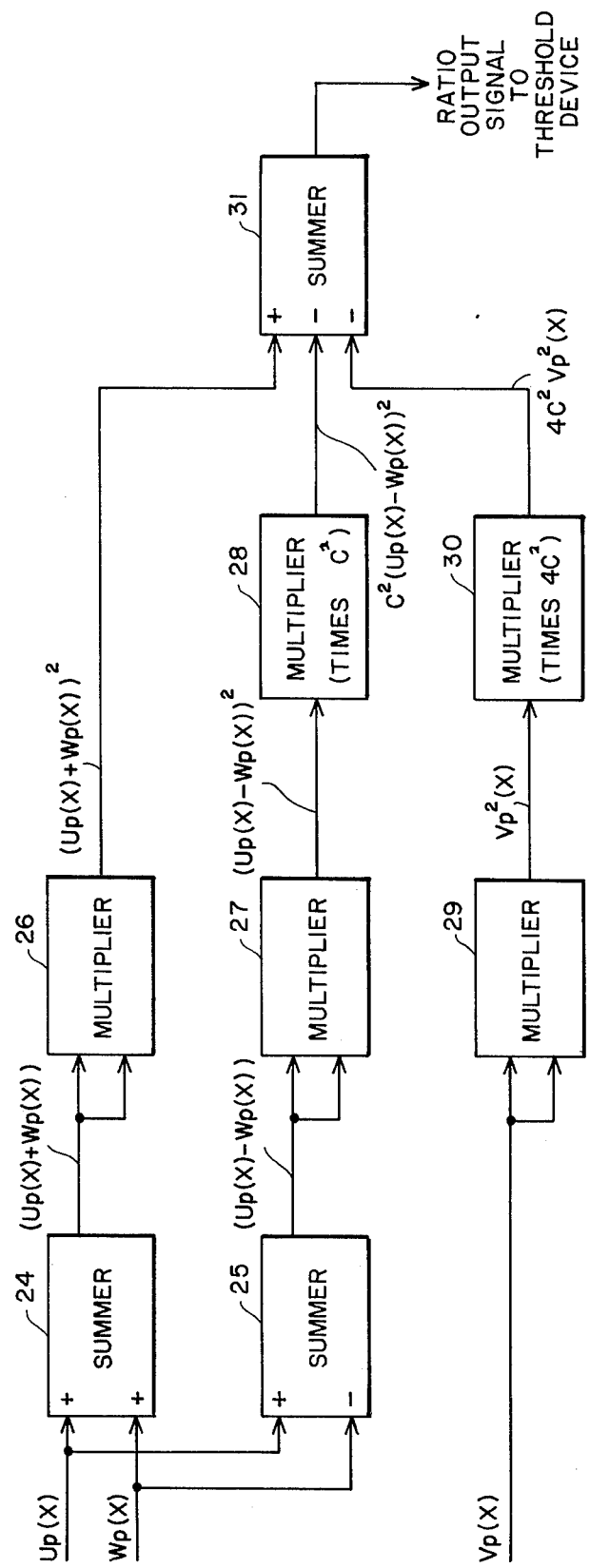

MSK DIGITAL DATA SYNCHRONIZATION DETECTOR

BACKGROUND OF THE INVENTION

This invention relates to digital data transmission systems for transmitting Baudot code characters each having start and stop bits in the form of a MSK digital data signal having a stop-start triangle corresponding to adjacent stop and start bits of two adjacent Baudot characters and more particularly to a MSK digital data synchronization detector for such systems.

MSK is an abbreviation for "minimum shift keying" and may be defined as a signal where the transmitted wave is a phase continuous frequency shift waveform. For each unit timme interval the instantaneous frequency is a constant being either a high frequency or a low frequency relative to a center frequency. The high frequency is such as to advance by one phase revolution relative to the carrier frequency in four unit time intervals. The low frequency is such as to fall behind by one phase revolution relative to the carrier frequency in four unit time intervals.

In the past, Baudot code characters each having start and stop bits have been transmitted in the form of a CSK modulation. CSK is an abbreviation for "compatible shift keying". A CSK data stream is a continuous frequency shift modulation waveform with the same upper and lower frequencies as MSK modulation. The only difference between MSK and CSK modulation is in the method in which the data in modulated on to the carrier. In MSK modulation each data bit selects the sign of an amplitude modulated carrier phase in the form of $$\cos w_o t \cos w_m t \quad (1)$$

where $-T \leq t < T$, $4 w_n T = 2\pi$, $w_o$ is equal to the carrier frequency in radians, $w_m$ is equal to the modulating frequency in radians, $T$ is equal to a unit time interval and $t$ is equal to time. In CSK modulation each data bit selects the instantaneous frequency of the transmitted signal of one bit time.

One prior art procedure for CSK modulation signal detection and, hence, synchronization detection, is to search in various carrier phases in bit times looling for stable tracking behavior and low orthogonal signals. Stable tracking behavior and low orthogonal signals indicate signal presence and also synchronization. The direct data decision procedure is to decide each CSK bit separately.

An alternate procedure employed in the prior art is to use MSK decisions and to convert 6 MSK decisions into 5 CSK decisions.

One of the disadvantages of the above-mentioned prior art detectors is that they require a high signal-to-noise ratio, or multiple searches to acquire synchronization at the same signal-to-noise ratio. Also, the error rate for the above prior art procedures require several db (decibel) more signal-to-noise ratio for the same probability of error at Baudot character error rates of $10^{-3}$ or lower.

SUMMARY OF THE INVENTION

An object of the present invention is to provide a MSK digital data synchronization detector for MSK digital data signals transmitting Baudot code characters that overcomes the disadvantages of the above-mentioned prior art digital data synchronization detectors.

A feature of the present invention is the provision of a minimum shift keying (MSK) digital data synchronization detector for a digital data transmission system transmitting Baudot code characters each having start and stop bits in the form of a MSK digital data signal having a stop-start triangle corresponding to adjacent stop and start bits of two adjacent Baudot characters comprising: a first source of the MSK digital data signal; first means coupled to the first source to produce first and second correlation signals; second means coupled to the first means, the second means being responsive to the first and second correlation signals to produce inphase and quadrature triangle signals; third means coupled to the second means, the third means being responsive to the inphase and quadrature triangle signals to calculate many time and phase conditions of the MSK digital data signal at one time to produce third, fourth and fifth correlation signals as a function of assumed bit times; and fourth means coupled to the third means, the fourth means being responsive to the third, fourth and fifth correlation signals to produce a ratio signal proportional to a ratio of a minimum magnitude squared to a maximum magnitude squared for all carrier phase angles for each of the assumed bit times and to produce a synchronization detected signal when the ratio signal value is less than a given amplitude threshold.

BRIEF DESCRIPTION OF THE DRAWING

Above-mentioned and other features and objects of this invention will become more apparent by reference to the following description taken in conjunction with the accompanying drawing, in which:

FIG. 1 is a set of curves illustrating the conversion of Baudot code characters with CSK modulation to MSK form;

FIG. 2 is a graph illustrating the stop-start triangles of one stop-start sequence in the MSK data of Curve C, FIG. 1;

FIG. 3 is a graph illustrating the random characteristics of the MSK data corresponding to bits 1–5 of the Baudot character of Curve C, FIG. 1;

FIG. 6 is a schematic block diagram of the ratio calculator of FIG. 4 in accordance with the principles of the present invention.

DESCRIPTION OF THE PREFERRED EMBODIMENT

Figure 4:
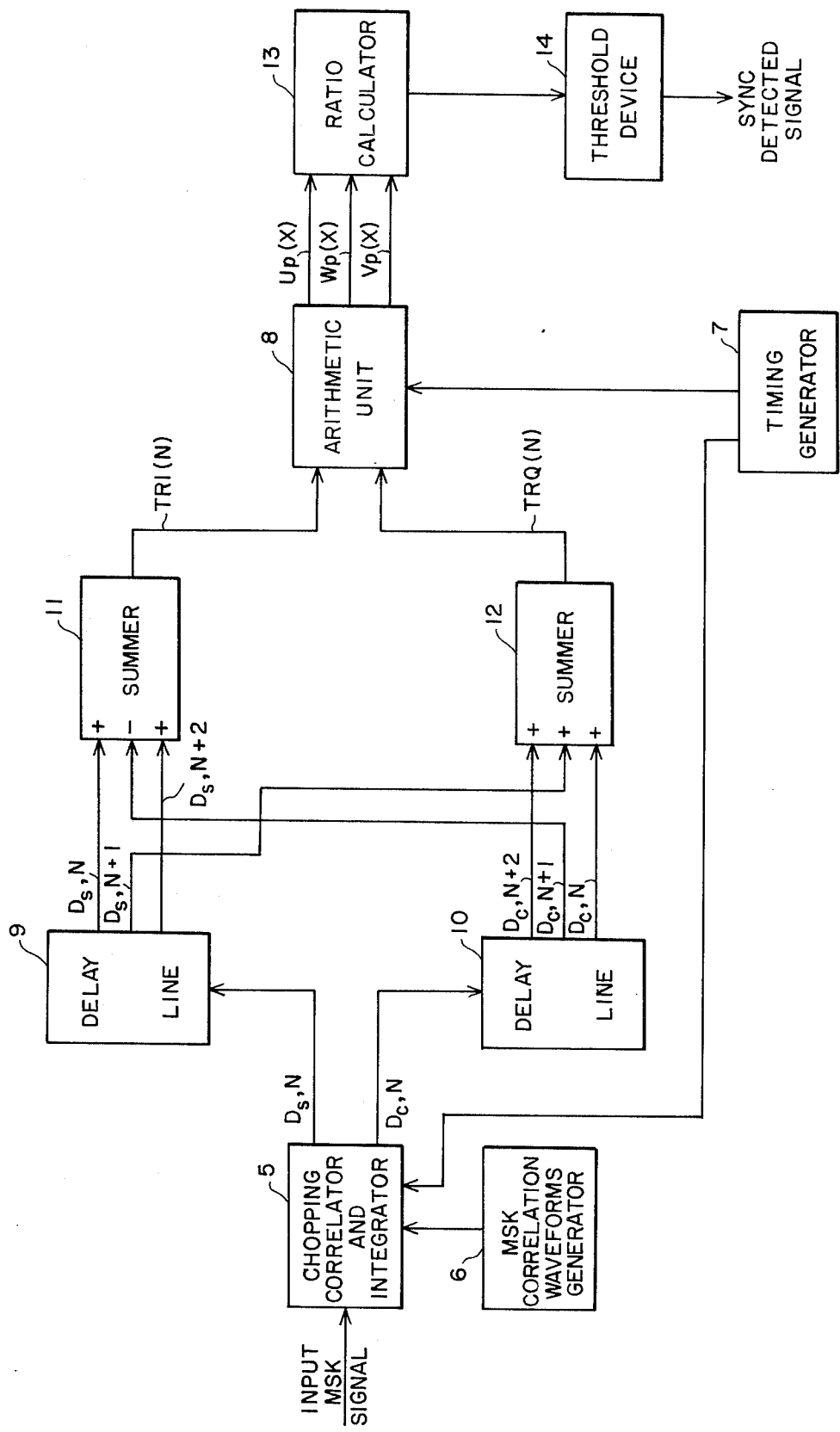
FIG. 4 is a schematic block diagram of the MSK digital data synchronization detector in accordance with the principles of the present invention.

In accordance with the principles of the present invention the synchronization detector disclosed herein reduces the error rate of the prior art synchronization detectors by two features. The first feature is that MSK synchronization detection is used rather than CSK synchronization detection since MSK synchronization detection is by phase reversal decisions which is better than CSK synchronization detection which uses orthogonal decisions. The second feature is that the stop and start bits which are fixed in a Baudot code character form a triangle, that is, three linked MSK bits. This triangle is used in the decisions on the MSK data bits which are adjacent to the triangle to recover the Baudot characters. Thus, there are only four single MSK bits to be determined instead of six MSK bits, which would be the appropriate number if straight MSK detection were used. Straight MSK detection followed by MSK to CSK conversion is equivalent to coherent detection followed by the differential encoding which is a well known detection technique for differential modulation. Also, if the stop-start triangle is employed for signal detection with a MSK digital data signal synchronization detector at several bit times for each of two phases per time sample and then a calculation is made of the phase dependence using the known phase progression properties of the MSK digital data signal, signal detection and, hence, synchronization is much improved because the triangle forms a special symbol which is much easier to recognize than single bits with a given phase dependence. My first copending application, Ser. No. 628,710, filed Nov. 14, 1975, fully discloses the MSK digital data signal synchronization detector employed in the present invention with a slight modification thereto. The disclosure of this first copending application is incorporated herein by reference.

Referring to FIG. 1, Curve A illustrates the Baudot code characters with CSK data modulation. Curve B illustrates the frequency of the various bits of the data of Curve A where the question marks indicate that the data bits of the Baudot character can be either a high or low frequency depending upon the state of the data bits of the Baudot characters. Curve C illustrates MSK data which is the equivalent of the CSK data of Curve A. This Curve C also illustrates the inphase triangle signal referred to herein. Curve D illustrates the MSK data of Curve C shifted 90° inphase and is referred to herein as the quadrature triangle signal.

Referring to FIG. 2, there is illustrated therein two stop-start triangles 1 and 2. These two stop-start triangles are derived from Curve C, FIG. 1 at portion 3 thereof in the following manner. Stop-start triangle 1 is obtained by following the path in portion 3 of Curve C, FIG. 1 from 0° to 270° to 0°, while the stop-start triangle 2 is obtained in portion 3 of Curve C, FIG. 1 by following the path 180° to 90° to 180°.

Stop-start triangles 1 and 2 provide the special symbol referred to hereinabove which is much easier to recognize than single bits with a given phase dependence for synchronization detection or MSK data signal presence.

Referring to FIG. 3, there is illustrated therein the random nature of the possible phase routes which one can follow in portion 4 of Curve C, FIG. 1 for the data bits 1-5 of the Baudot character in Curve A.

Referring to FIG. 4, the input MSK signal $r(t)$ is coupled to chopping correlator and integrator 5 with the input MSK signal being correlated with the standard MSK correlation waveforms, as provided by generator 6, at several assumed bits times. The MSK signal $r(t)$ may be produced by many well known MSK transmitters and modulators, such as the transmitter of FIG. 1 of U.S. Pat. No. 2,977,417 and the transmitter of the single Figure of U.S. Pat. No. 3,731,233, whose disclosures are incorporated herein by reference. Correlator and integrator 5 is fully disclosed in my second copending application, Ser. No. 618,537, filed Oct. 1, 1975, whose disclosure is incorporated herein by reference. A minor change to correlator and integrator 5 of the above-cited second copending application is that the output signal therefrom is parallel in nature rather than serial in nature which can be provided by coupling a serial-to-parallel converter to the output of the analog-to-digital converter of the chopping correlator and integrator of the above-cited second copending application.

Generator 6 may include sine and cosine generators whose outputs are coupled to a multiplier to provide the standard MSK correlation waveforms as defined in the following equations:

$$\sin w_o t \sin w_m (t - NT) \tag{2}$$

$$\cos w_o \sin w_m (t - NT) \tag{3}$$

for N equal to an integer 0, 1, 2, 3 ... and for each N, $NT < t < (N+2)T$.

Timing generator 7 provides timing signals to control the integrators, the multiplexers, the analog-to-digital converters, and serial-to-parallel converters of correlator and integrator 5. Timing generator 3 may be implemented by a stabilized clock source coupled to a digital counter with the output of the various stages of this digital counter being coupled to gating circuits to provide the desired timing signals to perform the desired time control of the above-mentioned elements of correlator and integrator 5. Timing generator 7 also provides appropriate timing signals for the arithmetic unit 8.

Correlator and integrator 5 provides two output signals; namely, a sine correlation signal and a cosine correlation signal which are defined in equations (4) and (5) as indicated below:

$$D_{s,N} = \int_{(N-2)T}^{NT} r(t) \sin w_o t \sin w_m (t - NT) dt \tag{4}$$

$$D_{c,N} = \int_{(N-2)T}^{NT} r(t) \cos w_o t \sin w_m (t - NT) dt \tag{5}$$

, where $D_s$ is the sine correlation signal, N is an integer as defined above and is also equal to the bit time, $D_c$ is equal to the cosine correlation signal, and the other terms of equations (4) and (5) are as previously defined. The $D_s$, N correlation signal is coupled to delay line 9 while the $D_c$, N correlation signal is coupled to delay 10. Each of delay lines 9 and 10 include three output taps spaced apart from each other in time by one bit time so as to produce three bit signals which will define the stop-start triangle when the MSK digital data signal is synchronized. Summer 11 and 12 are coupled as illustrated to the output taps of delay lines 9 and 10 at time equal to (N + 2). The minus sign in summer 11 is employed to indicate that the signal applied to this input terminal is inverted prior to addition to the other input signals. Summer 11 provides the inphase triangle signal TRI(N) while summer 12 produces the quadrature triangle signal TRQ(N). The inphase and quadrature triangle signals are defined by the following equations:

$$TRI(N) = D_s, N - D_c, N + 1 + D_s, N + 2 \tag{6}$$
$$TRQ(N) = D_c, N + D_s, N + 1 + D_c, N + 2 \tag{7}$$

Both of these triangle signals are coupled to arithmetic unit 8 and using appropriate timing signals from timing generator 7 form correlation signals $U_p(X)$, $W_p(X)$ and $V_p(X)$ as a function of assumed bit times X. These three correlation waveforms at the output of arithmetic unit 8 are defined by the following equations:

$$U_P(X) = \sum_{N=P-L}^{P} [TRI(X + 14N)]^2 + [TRQ(X + 7 + 14N)]^2 \quad (8)$$

$$W_P(X) = \sum_{N=P-L}^{P} [TRQ(X + 14N)]^2 + [TRI(X + 7 + 14N)]^2 \quad (9)$$

$$V_P(X) = \sum_{N=P-L}^{P} (-1)^N \cdot TRI(X + 14N) \cdot TRQ(X + 14N) \quad (10)$$

, where N of TRI(N) and TRQ(N) is equal to $(X + 14N)$ and $(X + 7 + 14N)$ with the $(X + 7 + 14N)$ indicating a shift of seven data bit times of both the triangular signals TRI and TRQ. With these values for N a number of time calculations for each of two phase calculations per time sample can be made. In the above equations (8) – (10) P is equal to the present bit number and the end of the summation and L is equal to the number of bits preceding bit P. Each sum of equations (8) – (10) represents the sum of $(2L + 2)$ terms ending at the $(X + 2P + 1)$ term for assumed bit times $X$.

The correlation waveforms at the output of arithmetic unit 8 are coupled to ratio calculator 13 to determine the ratio of a minimum magnitude squared to a maximum magnitude squared for all carrier phase angles for each assumed bit time $X$. This ratio is given as:

$$\text{RATIO}(X) = \frac{U_P(X) + W_P(X) - \sqrt{(U_P(X) \, W_P(X))^2 + 4 \, V_P^2(X)}}{U_P(X) \, W_P(X) + \sqrt{(U_P(X) \, W_P(X))^2 + 4 \, V_P^2(X)}} \; TH \quad (11)$$

, where TH is equal to the amplitude threshold value of threshold device 14.

Equation (11) can be transformed to equation (12) as indicated hereinbelow:

$$(U_P(X) + W_P(X))^2 - C^2 (U_P(X) - W_P(X))^2 - 4 V_P^2(X)) < 0 \quad (12)$$

by using the transformation procedure fully set forth in equations (8) – (15) of my above-cited first copending application.

The signal at the output of calculator 13 is the ratio signal and is tested for each assumed bit time against an amplitude threshold value in threshold device 14. The presence of a signal and, hence, synchronization is indicated when the value of the ratio signal is less than the amplitude threshold of device 14.

Figure 5:
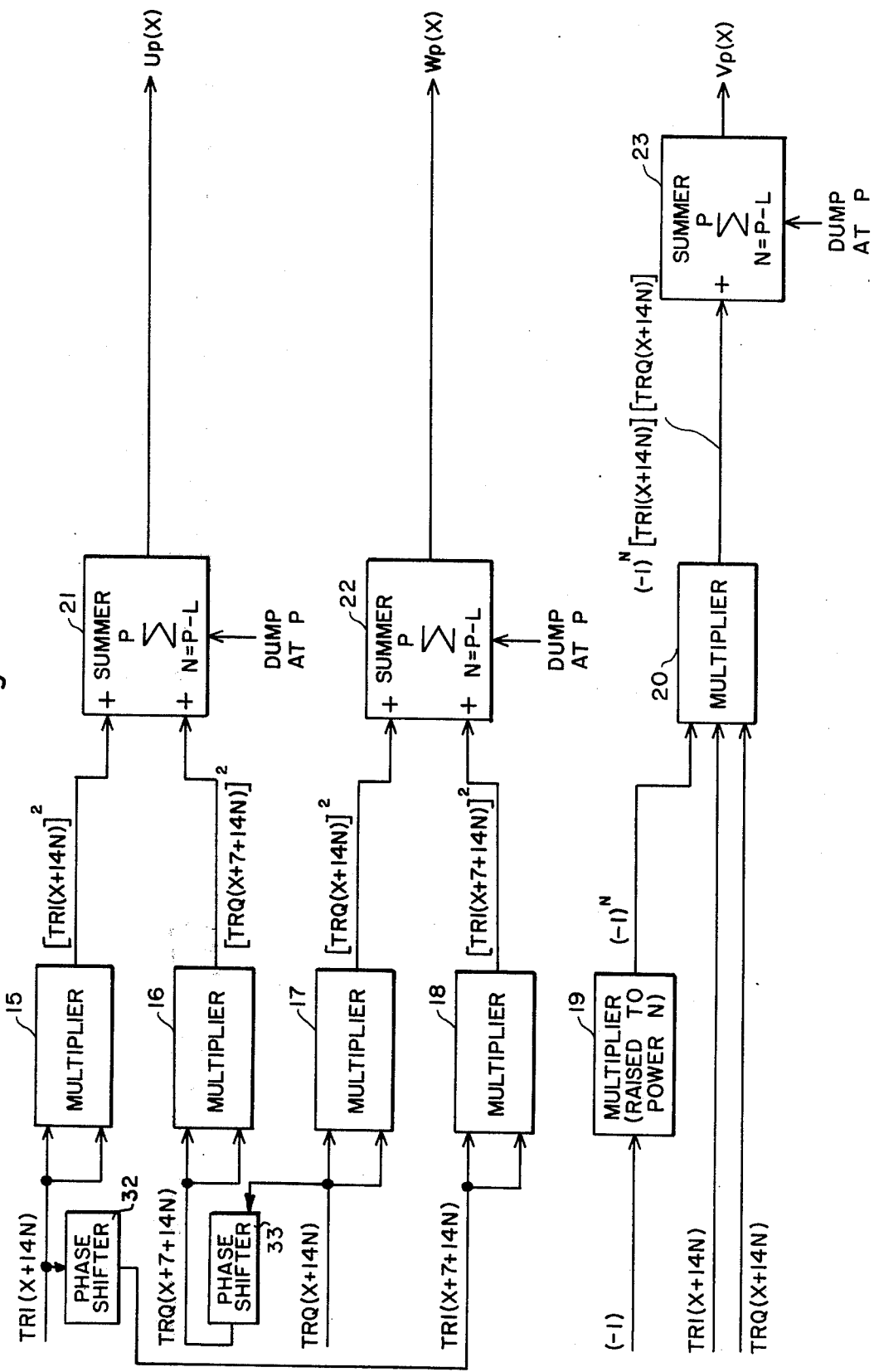
FIG. 5 is a schematic block diagram of the arithmetic unit of FIG. 4 in accordance with the principles of the present invention.

Referring to FIG. 5, there is illustrated therein a schematic block diagram of the arithmetic unit 8 of FIG. 4. The implementation of unit 8 disclosed in FIG. 5 is derived from equations (8) – (10). This implementation as illustrated in FIG. 5 includes with multipliers 15–20 phase shifters 32 and 33 and having the indicated input thereto and the indicated output therefrom which conform to the terms of equations (8) – (10). The output signals from multipliers 15 and 16 are coupled to a summer 21 which is dumped at the time P (the end of the summation) by a timing signal from generator 7 of FIG. 4 and generates the correlation signal $W_P(X)$. The output from multipliers 17 and 18 are coupled to summer 22 which also is dumped at time P (by the timing signal from generator 7 of FIG. 4) to provide the correlation $W_P(X)$. The output from multiplier 20 is coupled to summer 23 which also is dumped at time P (by the timing signal from generator 7 of FIG. 4) to produce the correlation signal $V_P(X)$.

Referring to FIG. 6, there is disclosed therein one possible implementation of the ratio calculator 13 of FIG. 4, which is derived from equation (12) which resulted from the transformation of the ratio set forth in equation (11). In accordance with equation (12) ratio calculator 13 of FIG. 4 includes summers 24 and 25 having the indicated correlation signal inputs coupled thereto to provide the desired output signal as dictated by equation (12) and illustrated in FIG. 6. The output from summer 24 is coupled to multiplier 26 to provide the first term of equation (12). The output of summer 25 is coupled to multiplier 27 and then to multiplier 28 to produce the second term of equation (12). Multiplier 29, having the correlation signal input as illustrated, and multiplier 30 cooperate to provide the third term of equation (12). The outputs from multipliers 26, 28 and 30 are coupled to summer 31 which provides the ratio output signal which is coupled to threshold device 14 of FIG. 4. It will be noted that summer 25 and summer 31 have certain ones of their input terminals labelled with a minus sign. This minus sign indicates that the input signal applied thereto is inverted prior to addition with the other input signals in the associated summers 25 and 31.

While I have described above the principles of my invention in connection with specific apparatus it is to be clearly understood that this description is made only by way of example and not as a limitation to the scope of my invention as set forth in the objects thereof and in the accompanying claims.

I claim:

1. A minimum shift keying (MSK) digital data synchronization detector for a digital data transmission system transmitting Baudot code characters each having start and stop bits in the form of a MSK digital data signal having a stop-start triangle corresponding to adjacent stop and start bits of two adjacent Baudot characters comprising:

an input for said MSK digital data signal;

first means coupled to said input to produce first and second correlation signals;

second means coupled to said first means, said second means being responsive to said first and second correlation signals to produce inphase and quadrature triangle signals;

third means coupled to said second means, said third means being responsive to said inphase and quadrature triangle signals to calculate many time and phase conditions of said MSK digital data signal at one time to produce third, fourth and fifth correlation signals as a function of assumed bit times; and fourth means coupled to said third means, said fourth means being responsive to said third, fourth and fifth correlation signals to produce a ratio signal proportional to a ratio of a minimum magnitude squared to a maximum magnitude squared for all carrier phase angles for each of said assumed bit times and to produce a synchronization detected signal when said ratio signal value is less than a given amplitude threshold.

2. A detector according to claim 1, wherein said first means includes a chopping correlator and integrator coupled to said input, a source of MSK correlation waveforms coupled to said chopping correlator and integrator, and a source of timing signals coupled to said chopping correlator and integrator.

3. A detector according to claim 1, wherein said second means includes
   a first delay line coupled to said first means, said first delay line having three output taps spaced from each other by one bit time responsive to said first correlation signal to produce first, second and third bit signals,
   a second delay line coupled to said first means, said second delay line having three output taps spaced from each other by one bit time responsive to said second correlation signal to produce fourth, fifth and sixth bit signals,
   a first summer coupled to said first and second delay lines, said first summer being responsive to said first and third bit signals and the inverse of said fifth bit signal to produce said inphase triangle signal, and
   a second summer coupled to said first and second delay lines, said second summer being responsive to said second, fourth and sixth bit signals to produce said quadrature triangle signal.

4. A detector according to claim 1, wherein said third means includes
   an arithmetic unit coupled to said second means, and
   a source of timing signals coupled to said arithmetic unit.

5. A detector according to claim 4, wherein said arithmetic unit includes
   a first multiplier coupled to said second means, said first multiplier squaring said inphase triangle signal to produce a first output signal,
   a first phase shifter coupled to said second means to phase shift said quadrature triangle signal a given amount,
   a second multiplier coupled to said first phase shifter, said second multiplier squaring said phase shifted quadrature triangle signal to produce a second output signal,
   a first summer coupled to said first and second multipliers, said first summer summing said first and second output signals and summing said summed first and second output signals for a given number of data bits to produce said third correlation signal,
   a second phase shifter coupled to said second means to phase shift said inphase triangle signal said given amount,
   a third multiplier coupled to said second phase shifter, said third multiplier squaring said phase shifted inphase triangle signal to produce a third output signal,
   a fourth multiplier coupled to said second means, said fourth multiplier squaring said quadrature triangle signal to produce a fourth output signal,
   a second summer coupled to said third and fourth multiplier, said second summer summing said third and fourth output signals and summing said summed third and fourth output signals for said given number of data bits to produce said fourth correlation signal,
   a source of minus one value,
   a fifth multiplier coupled to said source of minus one value to raise said minus one value by a given power to produce a fifth output signal,
   a sixth multiplier coupled to said second means and said fifth multiplier, said sixth multiplier multiplying said fifth output signal, said inphase triangle signal and said quadrature triangle signal to produce a sixth output signal, and
   a third summer coupled to said sixth multiplier, said third summer summing said sixth output signal for said given number of data bits to produce said fifth correlation signal.

6. A detector according to claim 1, wherein said fourth means includes
   a ratio calculator coupled to said third means, said ratio calculator producing said ratio signal, and
   a threshold device having said given amplitude threshold coupled to said ratio calculator, said threshold device producing said synchronization detected signal when said ratio signal value is less than said given amplitude threshold.

7. A detector according to claim 6, wherein said ratio calculator includes
   a first summer coupled to said third means, said first summer summing said third and fourth correlation signals to produce a first output signal,
   a second summer coupled to said third means, said second summer summing said third correlation signal and the inverse of said fourth correlation signal to produce a second output signal,
   a first multiplier coupled to said first summer, said first multiplier squaring said first output signal,
   a second multiplier coupled to said second summer, said second multiplier squaring said second output signal,
   a third multiplier coupled to said third means, said third multiplier squaring said fifth correlation signal,
   a fourth multiplier coupled to said second multiplier, said fourth multiplier having a multiplication factor equal to a given constant value squared to multiply said squared second output signal by said first factor to produce a third output signal,
   a fifth multiplier coupled to said third multiplier, said fifth multiplier having a second multiplication factor equal to four times said given constant value squared to multiply said squared fifth correlation signal by said second factor to produce a fourth output signal, and
   a third summer coupled to said first, fourth and fifth multipliers, said third summer summing said squared first output signal and the inverse of said third and fourth output signals to produce said ratio signal.

8. A detector according to claim 1, wherein said first means includes
   a chopping correlator and integrator coupled to said input,
   a source of MSK correlation wherein waveforms coupled to said chopping correlator and integrator, and
   a source of timing signals coupled to said chopping correlator and integrator;
said second means includes
   a first delay line coupled to said chopping correlator and integrator, said first delay line having three output taps spaced from each other by one bit time responsive to said first correlation signal to produce first, second and third bit signals,
   a second delay line coupled to said chopping correlator and integrator, said second delay line having three output taps spaced from each other by one bit time responsive to said second correlation signal to produce fourth, fifth and sixth bit signals,
   a first summer coupled to said first and second delay lines, said first summer being responsive to said first and third bit signals and the inverse of said fifth bit signal to produce said inphase triangle signal, and a second summer coupled to said first and second delay lines, said second summer being responsive to said second, fourth and fifth bit signals to produce said quadrature triangle signal;

said third means includes an arithmetic unit coupled to said first and second summers, and said source of timing signals coupled to said arithmetic unit; and said fourth means includes a ratio calculator coupled to said arithmetic unit, said ratio calculator producing said ratio signal, and a threshold device having said given amplitude threshold coupled to said ratio calculator, said threshold device producing said synchronization detected signal when said ratio signal is less than said given amplitude threshold.

9. A detector according to claim 1, wherein said first means includes a chopping correlator and integrator coupled to said input, a source of MSK correlation waveforms coupled to said chopping correlator and integrator, and a source of timing signals coupled to said chopping correlator and integrator;

said second means includes a first delay line coupled to said chopping correlator and integrator, said first delay line having three output taps spaced from each other by one bit time responsive to said first correlation signal to produce first, second and third bit signals, a second delay line coupled to said chopping correlator and integrator, said second delay line having three output taps spaced from each other by one bit time responsive to said second correlation signal to produce fourth, fifth and sixth bit signals, a first summer coupled to said first and second delay lines, said first summer being responsive to said first and third bit signals and the inverse of said fifth bit signal to produce said inphase triangle signal, and a second summer coupled to said first and second delay lines, said second summer being responsive to said second, fourth and fifth bit signals to produce said quadrature triangle signal;

said third means includes a first multiplier coupled to said first summer, said first multiplier squaring said inphase triangle signal to produce a first output signal, a first phase shifter coupled to said second summer to phase shift said quadrature triangle signal a given amount, a second multiplier coupled to said first phase shifter, said second multiplier squaring said phase shifted quadrature triangle signal to produce a second output signal, a third summer coupled to said first and second multipliers and said source of timing signals, said third summer summing said first and second output signals and summing said summed first and second output signals for a given number of data bits to produce said third correlation signal, a second phase shifter coupled to said first summer to phase shift said inphase triangle signal said given amount, a third multiplier coupled to said second phase shifter, said third multiplier squaring said phase shifted inphase triangle signal to produce a third output signal, a fourth multiplier coupled to said second summer, said fourth multiplier squaring said quadrature triangle signal to produce a fourth output signal, a fourth summer coupled to said third and fourth multipliers and said source of timing signals, said fourth summer summing said third and fourth output signals and summing said summed third and fourth output signals for said given number of bits to produce said fourth correlation signal, a source of minus one value, a fifth multiplier coupled to said source of minus one value to raise said minus one value by a given power to produce a fifth output signal, a sixth multiplier coupled to said first and second summers and said fifth multiplier, said sixth multiplier multiplying said fifth output signal, said inphase triangle signal and said quadrature triangle signal to produce a sixth output signal, and a fifth summer coupled to said sixth multiplier and said source of timing signals, said fifth summer summing said sixth output signal for said given number of data bits to produce said fifth correlation signal; and said fourth means includes a sixth summer coupled to said third and fourth summers, said sixth summer summing said third and fourth correlation signals to produce a seventh output signal, a seventh summer coupled to said third and fourth summers, said seventh summer summing said third correlation signal and the inverse of said fourth correlation signals to produce an eighth output signal, a seventh multiplier coupled to said sixth summer, said seventh multiplier squaring said seventh output signal, an eighth multiplier coupled to said seventh summer, said eighth multiplier squaring said eighth output signal, a ninth multiplier coupled to said fifth summer, said ninth multiplier squaring said fifth correlation signal, a tenth multiplier coupled to said eighth multiplier, said tenth multiplier having a first multiplication factor equal to a given constant value squared to multiply said squared eighth output signal by said first factor to produce a ninth output signal, an eleventh multiplier coupled to said ninth multiplier, said eleventh multiplier having a second multiplication factor equal to four times said first factor to multiply said squared fifth correlation signal by said second factor to produce a tenth output signal, an eighth summer coupled to said seventh, tenth and eleventh multipliers, said eighth summer summing said squared seventh output signal and the inverse of said ninth and tenth output signals to produce said ratio signal, and a threshold device having said given amplitude threshold coupled to said eighth summer, said threshold device producing said synchronization detected signal when said ratio signal value is less than said given amplitude threshold.

* * * * *